No. 615,630.  
F. W. MORGAN.  
PNEUMATIC TIRE.  
(Application filed Sept. 9, 1898.)  
Patented Dec. 6, 1898.
(No Model.) 2 Sheets—Sheet 1.
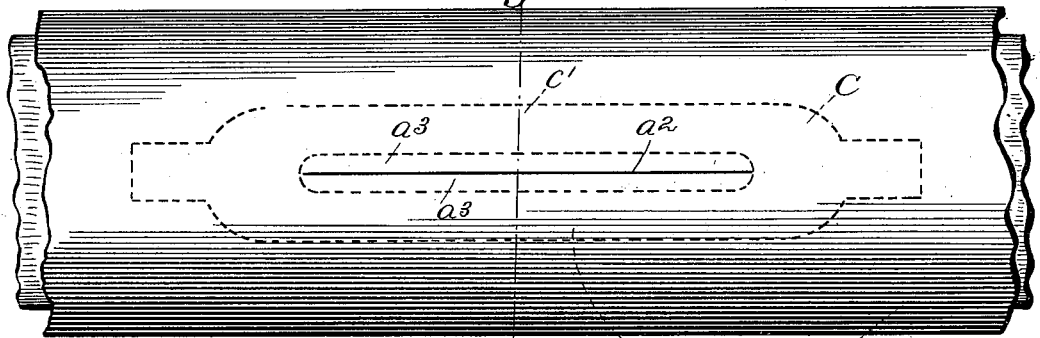
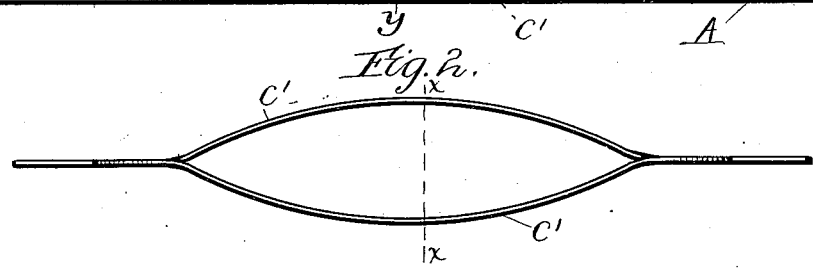
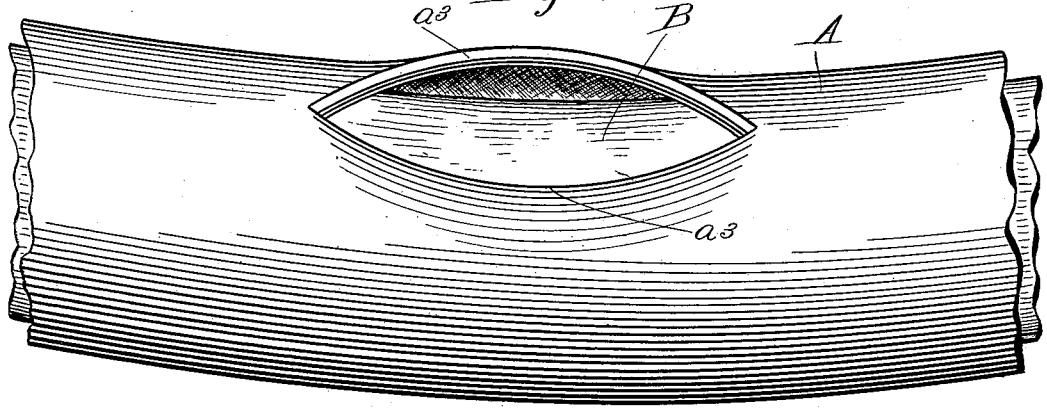
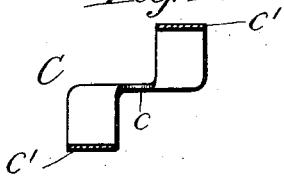
Witnesses:
A. F. Durand
Murray A. White
Inventor:
Fred W. Morgan
by Chas. G. Page
Atty.
THE NORRIS PETERS CO., PHOTO-LITHO., WASHINGTON, D. C.

No. 615,630. Patented Dec. 6, 1898.
F. W. MORGAN.
PNEUMATIC TIRE.
(Application filed Sept. 9, 1898.)
(No Model.) 2 Sheets—Sheet 2.
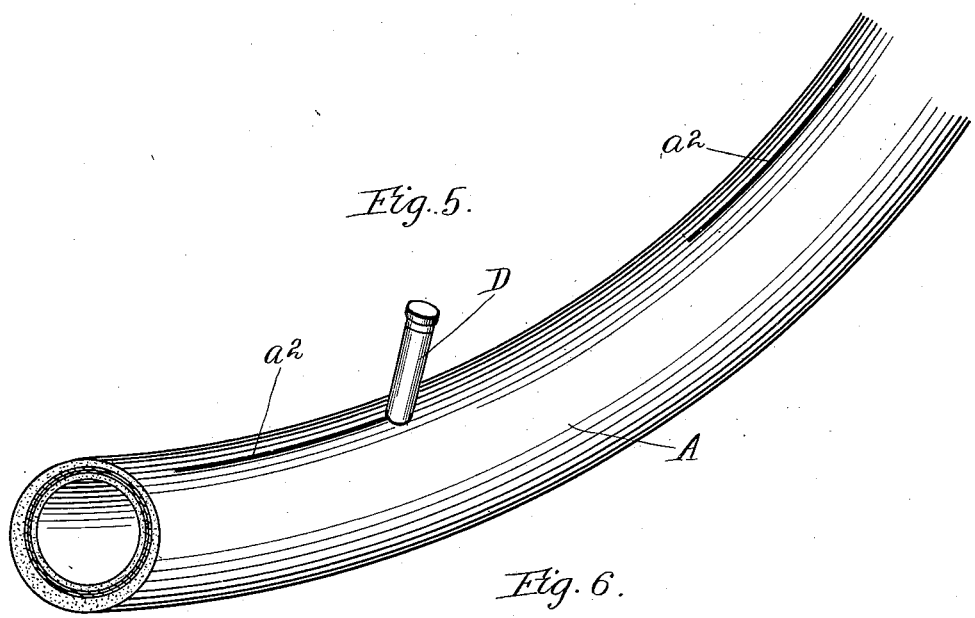
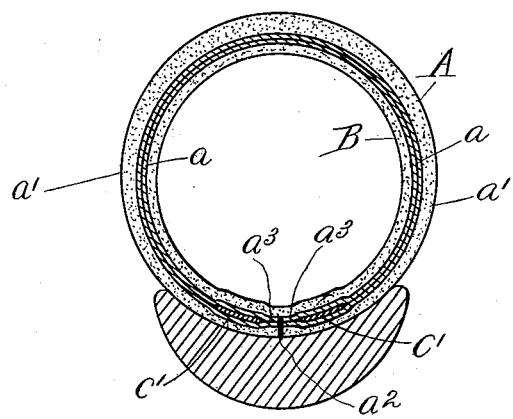
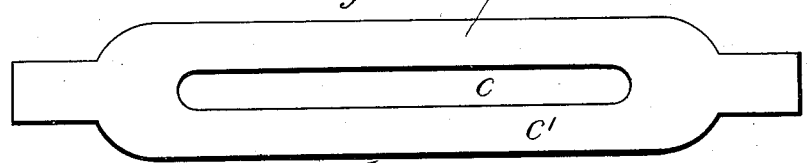
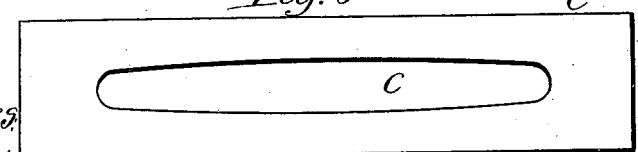
Witnesses
A. F. Durand
Murray A. White
Inventor:
Fred W. Morgan
by Chas. G. Page Atty

UNITED STATES PATENT OFFICE.

FRED W. MORGAN, OF CHICAGO, ILLINOIS.

PNEUMATIC TIRE.

SPECIFICATION forming part of Letters Patent No. 615,630, dated December 6, 1898.

Application filed September 9, 1898. Serial No. 690,562. (No model.)

*To all whom it may concern:*

Be it known that I, FRED W. MORGAN, a citizen of the United States, residing at Chicago, in the county of Cook, State of Illinois, have invented a certain new and useful Improvement in Pneumatic Tires, of which the following is a specification.

My invention relates to pneumatic tires of the class known as "double-tube" pneumatic tires and involving as a matter of general construction an annular tubular sheath or casing usually composed of layers of fabric and rubber and containing an inner inflatable air-tube having a valve device whereby it can be inflated and deflated at will.

While various constructions of double-tube tires have been proposed, the only construction which has heretofore met with favor and which at the present time has entirely supplanted all other proposed forms of double-tube tires involving an annular tubular sheath or casing and an inner inflatable tube therefor is the well-known "Morgan & Wright" double-tube tire, in which the casing is provided with a short slit normally laced and of a length to permit the inner tube to be introduced and withdrawn when the edge portions of the tire along such slit are unlaced. With such arrangement the tubular casing is laced, and thereby closed, along the slit after the inner tube has been introduced, and when it becomes desirable to remove the inner tube either for purposes of repair or for replacement by a new tube the casing must be unlaced along the slit and the inner tube withdrawn through the latter.

Objects of my invention are to provide a simple and practical construction of double-tube pneumatic tire having a normally-closed tubular sheath or casing which can be readily opened at intervals along the base or seating portion, so as to permit portions of the inner tube to be withdrawn for purposes of repair without necessitating time and labor incident to the withdrawal and replacement of the entire inner tube, to render the casing self-closing at the points whereat it can be thus temporarily opened, to dispense with lacing or other closing devices requiring time and trouble in manipulating them, to avoid undesirable lateral stretch or expansion on the part of the casing at the points where it can be opened and also to avoid undesirable longitudinal stretch at such points, to avoid injury to the inner tube, and to provide an annular tubular casing normally closed and presenting a practically undiminished area of seating-surface which can be temporarily cemented to an ordinary wheel-rim.

To the attainment of the foregoing and other useful ends, my invention consists in matters hereinafter set forth.

In the accompanying drawings, Figure 1 is a plan view of a portion of a double-tube tire embodying my invention, the length of tire shown being such as to show but one of the slits in its base portion. Fig. 2 is an edge view of one of the stay-plates, the separated longitudinal portions of the plate being shown temporarily bent in opposite directions for the purpose of illustrating the way in which it can be manipulated for the purpose of opening the casing. Fig. 3 shows in perspective a portion of the tire opened above the split in the casing. Fig. 4 is a section on line $x\,x$ in Fig. 2. Fig. 5 is a perspective view on a smaller scale of a portion of the tire of a length to show a couple of slits. Fig. 6 is a section taken transversely through the tire and an ordinary "crescent" wheel-rim, the section being on line $y\,y$ in Fig. 1. Fig. 7 is a plan view of one of the stay-plates. Fig. 8 shows a modified form of stay-plate.

The tire is of the double-tube type and comprises an annular tubular sheath or casing A, containing an independently-made inner tube B. The casing can be of any known or suitable construction, being preferably composed of one or more inner layers $a$ of fabric and an outer layer $a'$ of rubber or rubber compound. The inner tube is preferably of the kind employed in what are commonly known as the "Morgan & Wright" double-tube tires, being in such case made with closed terminals and of a length to permit its end portions to lap within the casing. It could, however, have its ends suitably united or telescoped within the casing, so as to form therein an endless tube. The inner tube is also provided with a valve whereby it can be inflated and deflated as usual, and as the application and use of such valve are well known further description thereof is unnecessary.

The tubular casing is provided with a series of longitudinally-disposed and normally-closed slits $a^2$, formed through its base or seating portion and arranged at intervals along the same, each slit being of a length to permit the casing to be opened, as hereinafter described, so as to allow all or suitable portions of the inner tube to be drawn out for purposes of repair. The casing is also provided with a series of flexible stays or reinforcements arranged to reinforce the slitted portions of the casing and prevent the latter from abnormal lateral and longitudinal stretch or expansion at such points. The stays are arranged to extend along opposite sides of the slits and, being flexible, permit the casing to be readily opened. As a simple and preferred construction and matter of further improvement each stay can consist of a thin oblong spring-metal plate C, provided with a longitudinal slit or preferably a slot $c$, substantially corresponding in length with or slightly longer than the length of a slit through the casing. These spring-plates can be molded in or otherwise suitably applied to the casing—as, for example, they can be arranged between the inner layers of fabric, where the casing is composed of two or more inner layers of fabric and an outer layer of rubber. If but one layer of fabric is used, however, the stay-plates can be arranged between the rubber and fabric. With either arrangement, however, the stay or stay-plate will practically form a part of the casing and will firmly adhere to the layers between which it is arranged. By thus applying a partially divided or slotted stay-plate to the casing the latter can be slit through its base portion along a line between the longitudinal edges of the slot in the plate without increasing its liability to unduly stretch or expand either laterally or longitudinally, since in such case the casing is reinforced along the sides of the slit by a stay which, while capable of flexure, will not stretch either way and will not permit the slit in the casing to spread.

A stay-plate slitted longitudinally for a portion of its length in correspondence with a slit in the casing and arranged with its slit in coincidence with the slit in the casing will permit the latter to be opened at such point by flexing the opposite longitudinal portions of the stay-plate in opposite directions, and hence such arrangement can be employed. I prefer, however, as a matter of further improvement to longitudinally divide the stay-plate for a portion of its length by a slot and to slit the casing along a line between the opposite longitudinal sides of such slot, so as to practically leave the casing with comparatively limited widths of free or non-reinforced portions $a^3$ along the slit therein and within the stay-plate—that is to say, within or opposite the area of opening formed by the slot in the stay-plate—as best illustrated in Fig. 1, by which arrangement the inner tube or a portion thereof can be more readily drawn out. The form of slot in one of the stay-plates can also be varied to accommodate the nipple or valve-casing D of the inner tube, and, if desired, the slots in all of the plates can be varied in form—as, for example, in place of forming the slot with straight parallel sides, as in Fig. 7, it can be formed so as to widen toward the middle of its length, as in Fig. 8, so as to further facilitate the opening of the casing to a suitable extent. The operation of opening the casing at a point where it is thus slitted and reinforced will be readily understood by reference to Figs. 2, 3, and 4. In Fig. 2 the longitudinal separated portions of one of the stay-plates are shown temporarily bent in opposite directions, the stay-plate being shown separately for clearer illustration of its action. When, therefore, it is desired to open the tire, the user can bend a portion of the casing at one side of the slit inwardly and also bend a corresponding portion of the casing at the opposite side of the slit outwardly, so as to open the casing, as in Fig. 3, it being observed that under such conditions one longitudinal portion $c'$ of the stay-plate will be bent inwardly, while the other corresponding portion $c'$ of such plate will be bent outwardly, the condition of the stay-plate when its side portions are thus bent in opposite directions substantially perpendicular to the plane of the plate being illustrated by Figs. 2 and 4. A suitable portion of the elastic inner tube can then be drawn out through such opening and repaired, it being observed that the tube will readily stretch to an extent to permit a suitable portion of its length to be thus drawn out. After the tube has been repaired it can be tucked within the casing, and upon inflating the tube it will resume its proper place. Upon releasing the portions of the casing which have been flexed, as above mentioned, such portions will spring back into their normal condition and their opposing edges will meet, and thereby again close the casing. It will be seen, therefore, that the casing can be provided at intervals with normally-closed slits which can be readily opened, so as to permit portions of the inner tube to be drawn out for the purpose of repair, and that the presence of these slits will not increase the liability of the casing to unduly stretch or expand either laterally or longitudinally; also, that the tire is self-closing at its portions which are slitted and stayed, and that the interior of the casing presents to the inner tube a smooth cylindric surface, which will avoid undesirable chafing on the part of the inner tube. Such arrangement also excludes dirt and moisture from the interior of the casing, and, further, affords a tire which can be temporarily cemented to a crescent wheel-rim, it being seen that the tire involves a tubular annular casing having along its base a set or series of normally-closed slits which can be readily opened when the tire is removed from the wheel-rim. As the stay-plates can be made comparatively thin the casing will not be materially or undesirably thickened at the points where it is thus provided with such stay-plates, and by incorporating the stay-plates within the casing the latter will not have objectionable projections either along its inner or outer sides.

What I claim as my invention is—

1. A hollow or pneumatic tire comprising an annular, tubular, flexible sheath or casing containing an inner, inflatable air-tube and provided with a series of slits whereby the casing can be opened at different points to permit the withdrawal of portions of the air-tube; the slitted portions of the casing being provided with flexible stays which hold them against lateral stretch or expansion and prevent the slits from spread, and the stayed portions of the casing at opposite sides of the slits being adapted to bend inwardly and outwardly, substantially as set forth, so as to allow the casing to be opened at such points.

2. A hollow or pneumatic tire comprising an annular, tubular, flexible sheath or casing containing an inner, inflatable air-tube and provided with a series of slits whereby the casing can be opened at different points to permit the withdrawal of portions of the air-tube; the slitted portions of the casing being provided with flexible, spring-stays which hold them against lateral stretch or expansion and prevent the slits from spread, and the spring-stayed portions of the casing at opposite sides of the slits being adapted to be bent inwardly and outwardly substantially as set forth, so as to allow the casing to be opened at such points.

3. A hollow or pneumatic tire comprising an annular, tubular, flexible sheath or casing containing an inner inflatable air-tube and provided with one or more slits of a length to permit the withdrawal of a portion or all of the inner air-tube; each slitted portion of the casing being provided with a flexible stay-plate divided longitudinally for a portion of its length, and having its line of division opposite the slit; said plate being adapted and applied to hold the slitted portion of the casing against lateral stretch, and prevent spread of the slit, but permitting the casing to be opened by bending the marginal portions of the casing at opposite sides of the slit, together with opposite longitudinal separated portions of the plate, in opposite directions.

4. A hollow or pneumatic tire comprising an annular, tubular, flexible sheath or casing containing an inner, inflatable air-tube, and provided with one or more spring stay-plates suitably secured thereto, and each having a longitudinally-extending slot; the casing being slit along a line between the longitudinal edges of each stay-plate, substantially as and for the purpose set forth.

5. A hollow or pneumatic tire comprising an annular, tubular, flexible pneumatic-tire casing containing a removable, inflatable, inner air-tube closed at its ends and havings its end portions lapping within the casing, the latter being provided at intervals along its base side with oblong stay-plates embedded or incorporated in the casing and having slots of a width to permit the passage of the inner tube or of portions thereof, the casing being slitted longitudinally along lines between the longitudinal edges of the slots in the stay-plates, and being normally closed at such points by flexible portions extending between the lines of the slits and the longitudinal edges of the stay-plates.

FRED W. MORGAN.

Witnesses:
ARTHUR F. DURAND,
MURRAY A. WHITE.